United States Patent [19]

Fenger et al.

[11] Patent Number: 5,009,856
[45] Date of Patent: Apr. 23, 1991

[54] RECYCLING CATALYST BED FOR FLUE GAS TREATMENT

[75] Inventors: Michael L. Fenger, McMurray; Francis R. Vargo, Munhall, both of Pa.

[73] Assignee: Consolidation Coal Company, Pittsburgh, Pa.

[21] Appl. No.: 279,738

[22] Filed: Dec. 5, 1988

[51] Int. Cl.⁵ .............................................. B01J 19/22
[52] U.S. Cl. .................................... 422/178; 414/173; 422/219
[58] Field of Search ................. 422/178, 219; 414/173

[56] References Cited

U.S. PATENT DOCUMENTS 2,236,138  3/1941  Howard .......................... 422/219 X Primary Examiner—Robert J. Warden
Assistant Examiner—Jill Johnston
Attorney, Agent, or Firm—Alan N. McCartney

[57] ABSTRACT

A catalyst bed having a mechanism for supporting catalyst blocks for transport through a flue to treat the flue gas, the mechanism functioning to permit removal of blocks from the flue for conditioning or replacement while permitting continuous operation of the catalyst bed.

3 Claims, 5 Drawing Sheets

RECYCLING CATALYST BED FOR FLUE GAS TREATMENT

BACKGROUND OF THE INVENTION

1. Field of the Invention

This invention relates to a recycling catalyst bed for treatment of flue gas.

2. Summary of the Prior Art

Flue gas resulting from the combustion of sulfur-containing fuel can be treated to reduce the sulfur dioxide content by introducing a dry absorbent into the boiler flue gas and passing the gas through a catalyst to convert the sulfur dioxide to sulfur trioxide which is readily absorbed by the ash and dry absorbent.

U.S. Pat. Nos. 4,350,670 and 4,649,034 generally describe a catalytic reactor for oxidizing $SO_2$ to $SO_3$ and subsequent formation of collectable sulfuric acid.

In the past, catalyst reactors to process $SO_2$ to $SO_3$ have not provided for continuous reactor cleaning, treatment, and catalyst replacement while permitting continued reactor service.

SUMMARY OF THE INVENTION

The purpose of this invention is to provide a recycling catalyst bed for treating flue gas resulting from the combustion of sulfur containing fuels such as coal.

It is an object of this invention to place a recycling oxidizing catalyst bed in the flue gas duct from a steam boiler convective heating section, the catalyst bed functioning to convert $SO_2$ to a compound readily absorbable for subsequent removal from the flue gas. Also, in selective catalytic reduction processes, the catalyst bed is used to convert $NO_x$ to molecular nitrogen which is a non-pollutant.

It is also an object of this invention to provide a recycling catalyst bed having a plurality of individual catalyst support blocks containing honeycomb or monolithic shaped elements supported on a carrier for movement of the blocks through the bed during use and removal from the bed for cleaning, treatment, and replacement of the catalytic elements while the bed continues in service.

It is a further object of this invention to provide a recycling catalyst bed in a flue gas duct, the bed having a plurality of individual catalyst support blocks passing through the bed and removable therefrom for cleaning and treatment, the blocks having maximum exposure to the flue gas while travelling through the duct to optimize utilization of the catalyst and obtain uniform wear of the catalyst block surfaces.

DESCRIPTION OF THE PREFERRED EMBODIMENT

Figure 1:
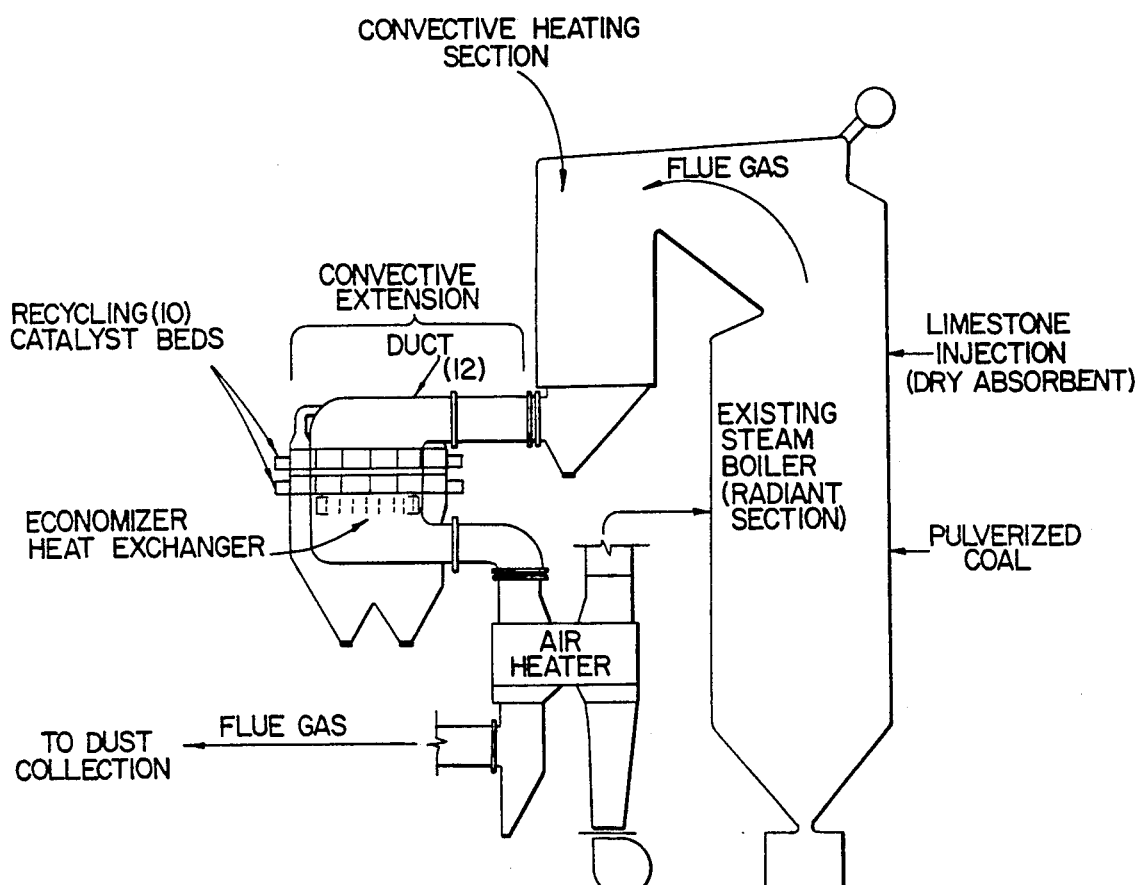
FIG. 1 is a schematic flow diagram of a combustor installation utilizing the recycling catalyst bed for $SO_2$ removal.

The recycling catalyst bed is positioned inside a duct which is an extension of an existing steam boiler convective heating section as shown in FIG. 1. The recycling catalyst bed 10 may also be positioned directly in the convective heating section if space is available. A typical flue gas treatment consists of converting sulfur dioxide gas ($SO_2$) to sulfur trioxide gas ($SO_3$) in the recycling catalyst bed. The $SO_3$ is rapidly absorbed by fuel ash, dry calcined limestone, dry lime and/or any other suitable dry alkaline oxide. The dry absorbent is injected into the boiler flue gas at various locations inside the boiler prior to the recycling catalyst bed. This recycling catalyst bed can also be used for reduction of $NO_x$ from a flue gas in a selective catalytic reduction process.

The catalyst bed is recycled while in service. A portion of the catalyst bed is taken out of the flue gas stream in order to remove accumulations of ash and apply surface treatments to maintain the catalyst activity. As a portion of the catalyst bed is taken out of the flue gas stream, a previously cleaned and treated portion is put back into the gas stream. The treatment of the flue gas is uninterrupted during recycling of the catalyst bed.

Figure 2:
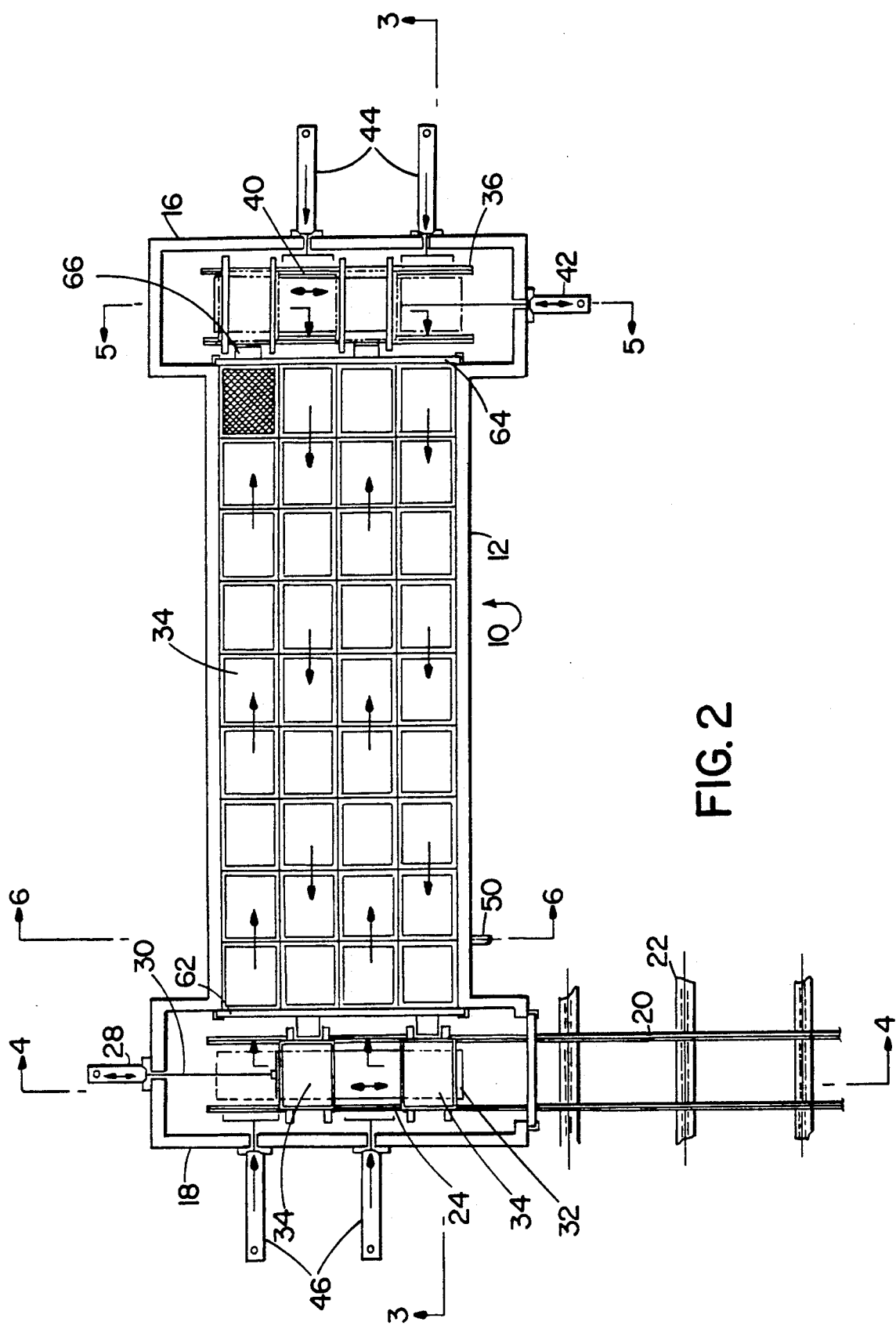
FIG. 2 is a top plan view of the catalyst bed.
Figure 8:
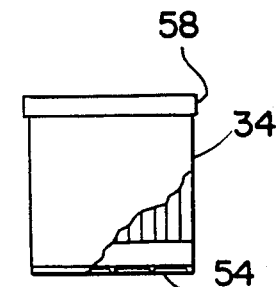
FIG. 8 is an enlarged side elevational view, partially broken away of the catalyst block.
Figure 9:
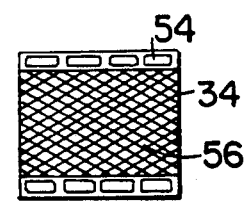
FIG. 9 is a bottom plan view of the catalyst block.

The recycling catalyst bed is made up of individual catalyst support blocks containing honeycomb or monolithic shaped elements as shown in FIGS. 8 and 9. Each element is a carrier-support for a coating containing a metallic or other oxidation-type catalyst which oxidizes $SO_2$ to $SO_3$. The flue gas with $SO_2$ and the dry absorbent flow through each block. The dry absorbent readily absorbs the $SO_3$. The blocks are arranged in a bed as shown in FIG. 2 with a portion in service and a portion being cleaned and treated. One or more beds are positioned in a duct as shown in FIG. 1 to treat the flue gas.

Figure 3:
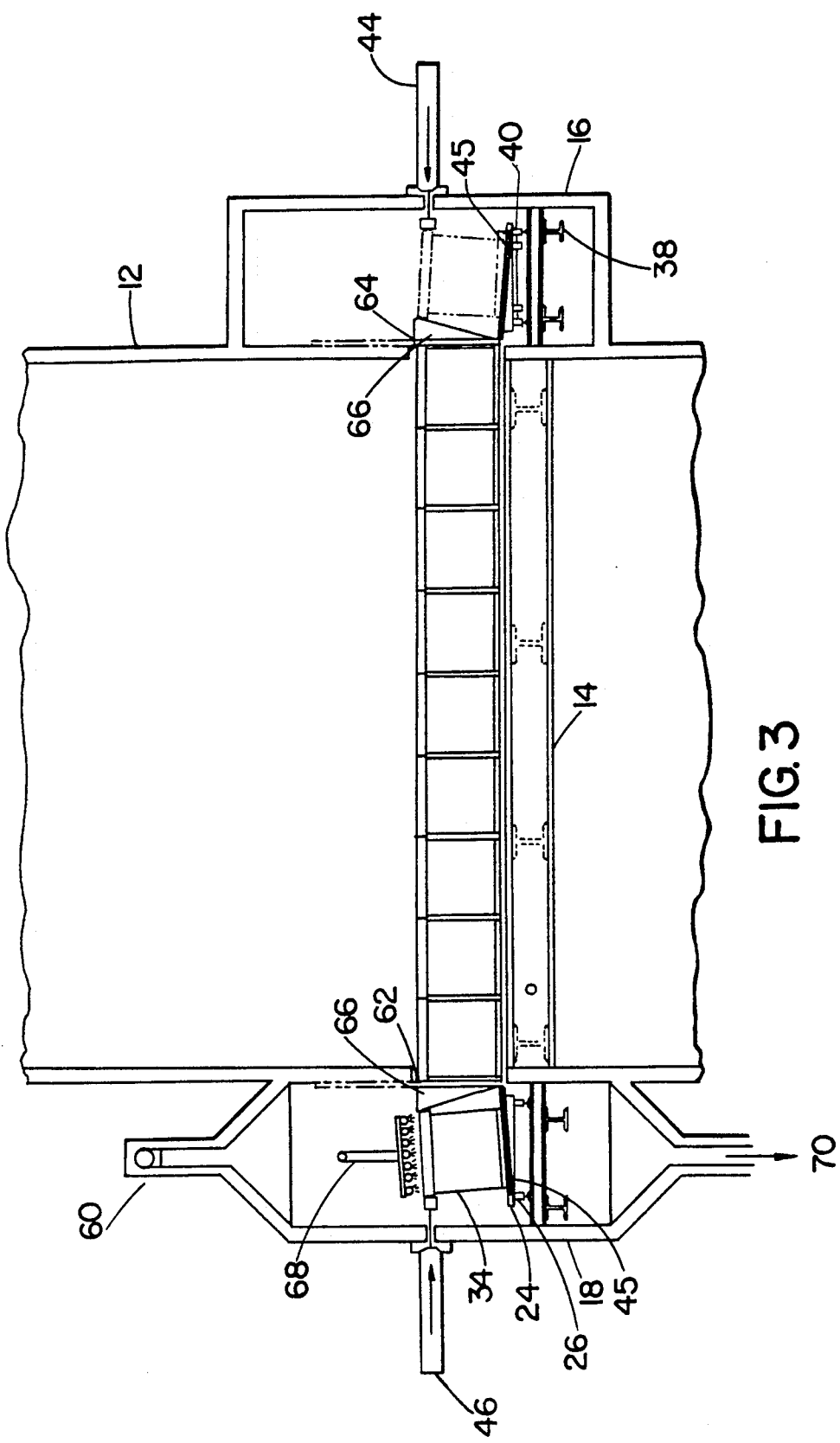
FIG. 3 is a sectional view taken along the lines 3—3 of FIG. 2 showing the catalyst bed positioned in a flue duct.
Figure 5:
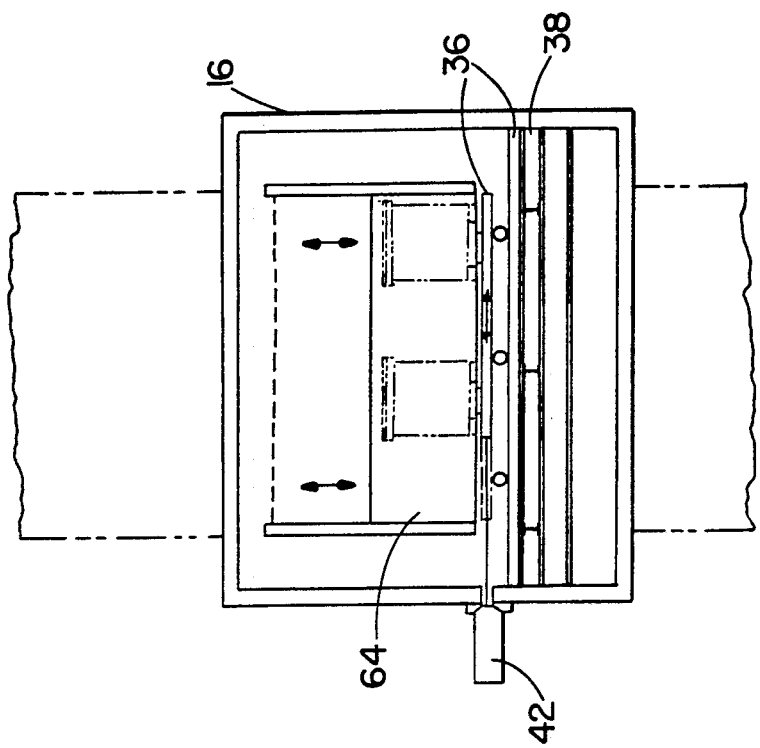
FIG. 5 is a sectional view taken along the lines 5—5 of FIG. 2.
Figure 4:
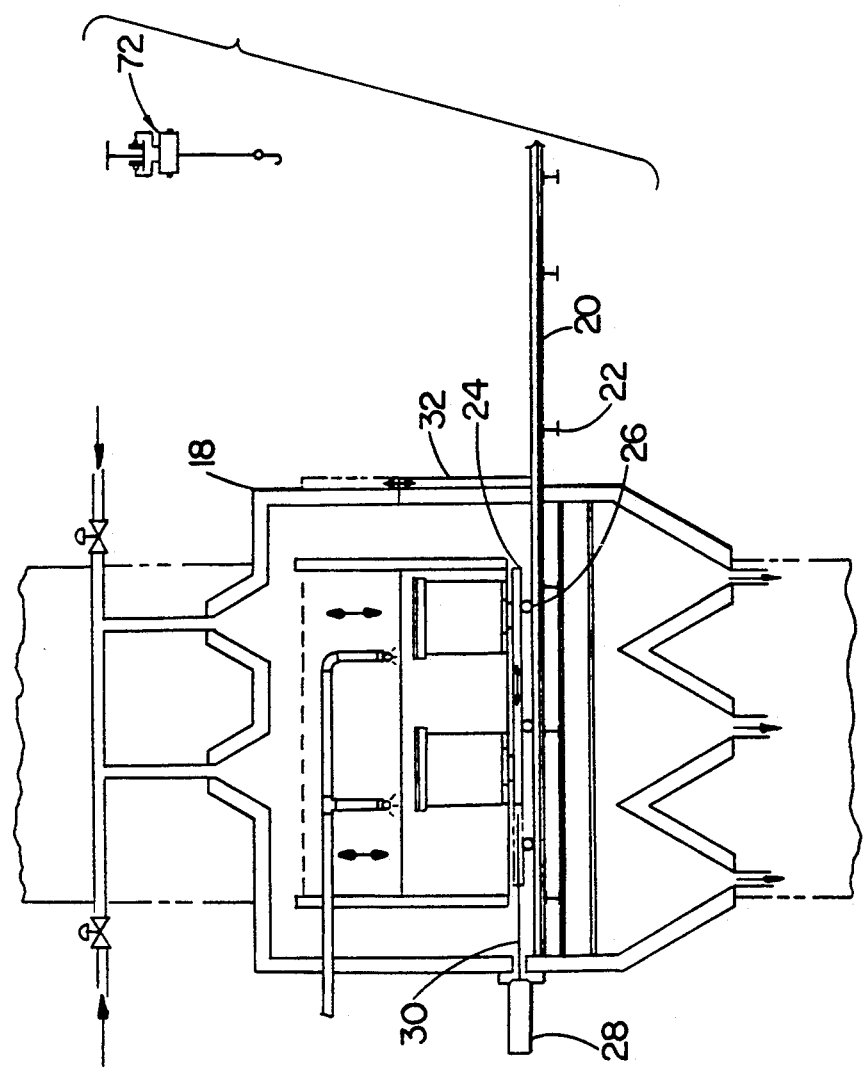
FIG. 4 is a sectional view taken along the lines 4—4 of FIG. 2.
Figure 6:
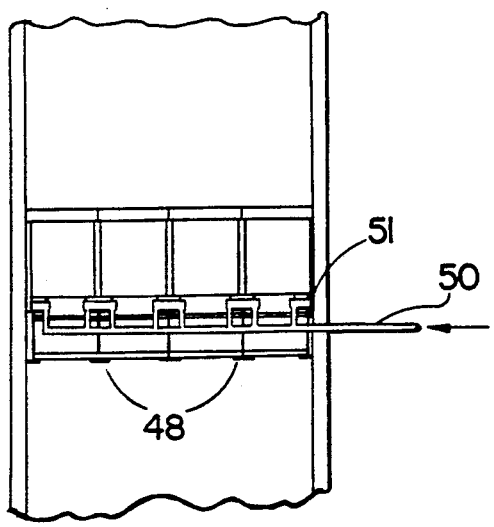
FIG. 6 is a sectional view taken along the lines 6—6 of FIG. 2.
Figure 7:
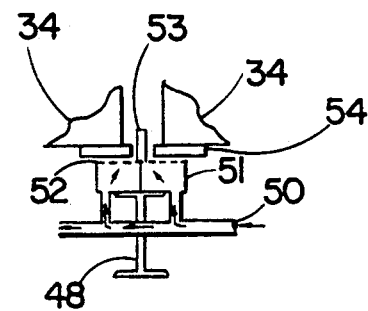
FIG. 7 is an enlarged view of the catalyst block air lift track.

The general arrangement for the recycling catalyst bed is shown in FIGS. 2 and 3. The in-service portion of the bed is surrounded by insulated duct walls. At each end of the bed are sealed block transfer enclosures with doors which are opened to allow catalyst support blocks to be removed and replaced by mechanical block positioners. Inside the transfer enclosures, the blocks are shifted on a transfer conveyor in order to cycle the blocks through the bed. At one end a number of blocks are held inside the transfer enclosure for cleaning and treatment.

Attention is now directed to FIGS. 2 and 3 which illustrate the bed 10 positioned in a flue duct 12. The bed 10 has a main support 14 and a block shifting enclosure 16 and block shifting and cleaning enclosure 18 exterior of the duct 12. A carriage track 20 mounted on supports 22 carries the reciprocating carriage 24 mounted on wheels 26. A drive mechanism, such as a cylinder 28 with rod 30 attached to carriage 24, will move the carriage 24 along the track 20 for placement into the enclosure 18. The blocks 34 of the catalyst bed are carried on the carriage 24. A sliding door 32 will close the enclosure 18 once the blocks 34 are positioned (see FIG. 2).

The block shifting enclosure 16 has a carriage track 36 mounted on support 38 for supporting a wheel mounted reciprocating carriage 40. A carriage drive mechanism 42 moves the carriage 40 on tracks 36. The blocks 34 in enclosure 16 are positioned on carriage 40. Offset right and left block pusher mechanisms 44, 46 respectively are positioned on the enclosures 16 and 18 to move the blocks 34 through the flue duct 12.

Attention is now directed to FIGS. 6 to 9 which disclose the air track support for the blocks 34 to assist in transporting the blocks through the flue 12. Supports 48 carry the manifolded air supply pipes 50 which have longitudinally extending air supply lines 51 that will supply air to the underside of blocks 34 through openings 52 (see FIG. 7). The blocks 34 have recessed pads 54 to contain the air so the blocks 34 can be lifted while being transported through the flue. A longitudinally extending upright spacer 53 is mounted on the lines 51 to space the lower portions of blocks 34. This provides a relative friction free movement of the blocks through the flue while being recycled. (Note should also be taken of the monolithic or honeycombed construction 56 of the oxidizing catalyst blocks as shown in FIG. 9.) Additionally, the blocks 34 have spacers 58 to separate the side walls of adjacent blocks to prevent the side walls adhering to each other in the dusty flue environment.

The sequence of operation of the described recycling and continuously operating catalyst bed thus described is as follows. Two catalyst blocks are introduced into the block shifting and cleaning enclosure 18 on the carriage 24. Activating the heating (and cooling) gas inlet 60 will raise the temperature in the enclosure 18 to raise the operating block temperature to that of the flue. The enclosure doors 62, 64 are then raised to provide access to the catalyst bed. Low pressure air is then fed into manifold 50 to raise the blocks. Activating the block pusher mechanism 46 will force the blocks into the bed, and at the same time remove two blocks into the enclosure 16. (Note that the inclined block support rollers 45 on the carriage permit the blocks to be easily inserted and removed from the enclosures). Thereafter the low pressure air to manifold 50 can be turned off and both doors 62, 64 are closed. (Note, the doors 62, 64 have inclined block pusher wedges 66 to force the blocks against the block pushers so the doors can freely close).

At the predetermined time for continued block recycling, after the blocks in enclosure 16 have been shifted on their carriage to a position in front of their block pushers, the doors 62, 64 can be raised, air supplied to manifold 50 to raise the blocks and the blocks again passed into and out of the flue by activating the block pushers. Thereafter, the low pressure air to manifold 50 can be turned off and the doors 62, 64 closed. At this point, the blocks in the enclosure 18 can be cooled through gas inlet 60 and treated through the high pressure air pipe and catalyst supply line 68 to blow gas and dust out outlet 70 and recondition the blocks. If it is desirable to inspect or replace the blocks, they can be cooled by gas inlet 60, and with the door 32 raised, the carriage can be moved on the tracks to make the blocks available outside enclosure 18 for inspection, repair or replacement. A block lifting hoist 72 or a portable crane can also be used to facilitate block handling.

In this fashion, it can be seen the bed can be continuously operating while the blocks are recycled and processed. Further, since the erosive air born particles in the flue will vary in concentration across the cross section of the flue, by having the blocks travel the designated path across the entire flue area, the wear on the individual block surfaces will be more uniform, extending the block life.

It should also be noted that for particular environments, it may be desirable to not only clean and treat the blocks in enclosure 18, but also to service the blocks in enclosure 16 in the same fashion.

We claim:

1. A recycling catalyst bed having a plurality of catalyst blocks adapted to be positioned in and transported through a flue duct for treating the flue gas and recycling the blocks comprising:
   (a) a flue duct having an open interior surface;
   (b) a support mechanism for positioning the blocks in the flue duct, said support mechanism having opposed ends adjacent said duct interior surface;
   (c) block shifting enclosures exterior of the flue duct adjacent each end of said support mechanism, at least one of said block shifting enclosures having means for cleaning the blocks;
   (d) means in each of said block shifting enclosures to support the blocks for shifting movement transverse to said support mechanism;
   (e) block pusher mechanisms adjacent to each of said block shifting enclosures to transport the blocks through and into and out of said support mechanism; and,
   (f) said support mechanism including an air manifold supplying air to the underside of the blocks to raise the blocks while being transported through said support mechanism to provide friction free movement of the blocks through said support mechanism.

2. The catalyst bed of claim 1 wherein said air manifold has longitudinally extending upright spacers to separate the blocks while being transported through said support mechanism.

3. The catalyst bed of claim 1 including doors between said block shifting enclosures and said support mechanism operable when transporting the blocks into and out of said support mechanism.

* * * * *